US008559724B2

(12) United States Patent  
Choi et al.

(10) Patent No.: US 8,559,724 B2  
(45) Date of Patent: Oct. 15, 2013

(54) APPARATUS AND METHOD FOR GENERATING ADDITIONAL INFORMATION ABOUT MOVING PICTURE CONTENT

(75) Inventors: Yoon-hee Choi, Suwon-si (KR); Il-hwan Choi, Yongin-si (KR); Hee-seon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 12/711,863

(22) Filed: Feb. 24, 2010

(65) Prior Publication Data  
US 2010/0246959 A1   Sep. 30, 2010

(30) Foreign Application Priority Data  
Mar. 27, 2009  (KR) .......................... 10-2009-0026619

(51) Int. Cl.  
*G06K 9/46* (2006.01)  
*G06K 9/64* (2006.01)  
*H04N 21/235* (2011.01)

(52) U.S. Cl.  
USPC ........... 382/190; 382/218; 382/224; 382/225; 707/706; 707/724; 707/737; 707/749; 707/750; 707/772; 707/E17.004; 707/E17.02; 707/E17.002; 707/E17.026; 707/914; 707/915

(58) Field of Classification Search  
USPC .......... 382/190, 218, 224, 225; 707/706, 724, 707/737, 749, 750, 772, E17.004, E17.02, 707/E17.022, E17.026, 914, 915  
See application file for complete search history.

(56) References Cited

U.S. PATENT DOCUMENTS

| 5,870,754 | A  | * | 2/1999  | Dimitrova et al.   | 1/1     |
|-----------|----|---|---------|--------------------|---------|
| 6,804,684 | B2 | * | 10/2004 | Stubler et al.     | 1/1     |
| 6,868,415 | B2 |   | 3/2005  | Kageyama et al.    |         |
| 7,170,632 | B1 | * | 1/2007  | Kinjo              | 358/1.9 |
| 2003/0179932 | A1 | * | 9/2003 | Katsuyama et al.  | 382/190 |
| 2005/0193408 | A1 |   | 9/2005 | Sull et al.       |         |
| 2007/0005571 | A1 |   | 1/2007 | Brewer et al.     |         |
| 2008/0021928 | A1 |   | 1/2008 | Yagnik            |         |
| 2008/0082523 | A1 |   | 4/2008 | Momosaki et al.   |         |
| 2008/0085055 | A1 | * | 4/2008 | Cerosaletti et al.| 382/225 |

(Continued)

FOREIGN PATENT DOCUMENTS

JP  2004-023345  1/2004  
JP  2007-148976  6/2007

(Continued)

OTHER PUBLICATIONS

Chen, et al. "A Match and Tiling Approach to Content-based Video Retrieval." 2001 IEEE International Conference on Multimedia and Expo. (2001): 417-420. Print.*

(Continued)

*Primary Examiner* — Michael A Newman  
(74) *Attorney, Agent, or Firm* — NSIP Law

(57) ABSTRACT

An apparatus and method for generating additional information about moving picture content, including: comparing image feature information about each image frame in moving picture content with image feature information about each image frame in web information, searching for an image frame in the moving picture content, the image frame matching the image frame in the web information, determining location information about the found image frame in the moving picture content, and generating additional information by use of the determined location information and the web information.

21 Claims, 5 Drawing Sheets

(56) References Cited

U.S. PATENT DOCUMENTS

| | | |
|---|---|---|
| 2008/0098432 A1* | 4/2008 | Hardacker et al. ............ 725/51 |
| 2008/0168499 A1 | 7/2008 | Kuroiwa et al. |
| 2008/0226130 A1* | 9/2008 | Kansal et al. ............. 382/106 |
| 2009/0228921 A1 | 9/2009 | Miki et al. |
| 2010/0177955 A1* | 7/2010 | Simakov et al. ............ 382/154 |

FOREIGN PATENT DOCUMENTS

| | | |
|---|---|---|
| JP | 2008-028529 | 2/2008 |
| JP | 2008-84115 | 4/2008 |
| JP | 2008-135045 | 6/2008 |
| JP | 2008-160337 | 7/2008 |
| JP | 2008-167363 | 7/2008 |
| JP | 2008-204007 | 9/2008 |
| JP | 2008-236373 | 10/2008 |
| KR | 10-2005-0112088 | 11/2005 |
| KR | 10-2007-0037778 | 4/2007 |
| KR | 10-2007-0101826 | 10/2007 |
| KR | 10-2008-0031695 | 4/2008 |
| KR | 10-2008-0051069 A | 6/2008 |
| WO | WO 2004/079522 A2 | 9/2004 |

OTHER PUBLICATIONS

Chen, et al. "Video Sequence Matching Based on Temporal Ordinal Measurement." Pattern Recognition Letters. 29. (2008): 1824-1831. Print.*

Eiji Kasutani et al., "The MPEG-7 Color Layout Descriptor: A Compact Image Feature Description for High-Speed Image/Video Segment Retrieval," *The International Conference on Image Processing (ICIP)*, Oct. 7-10, 2001, pp. 674-677, vol. 1, The Institute of Electrical and Electronics Engineers (IEEE), USA.

\* cited by examiner

KEYWORD: SHOES

APPARATUS AND METHOD FOR GENERATING ADDITIONAL INFORMATION ABOUT MOVING PICTURE CONTENT

CROSS-REFERENCE TO RELATED APPLICATION

This application claims the benefit under 35 U.S.C. §119(a) of Korean Patent Application No. 10-2009-0026619, filed on Mar. 27, 2009, the disclosure of which is hereby incorporated by reference in its entirety for all purposes.

BACKGROUND

1. Field

The following description relates to a system for providing content, and more specifically, to an apparatus and a method for generating additional information about moving picture content.

2. Description of the Related Art

Recently, the development of sky wave televisions, cable television, satellite digital multimedia broadcasting (DMB), terrestrial digital multimedia broadcasting (DMB), and internet protocol televisions (IPTV) has allowed users to enjoy a great amount of broadcast contents through various terminals. In particular, with the increase of two-way data broadcasting services, users are increasingly demanding to not only watch a program but to also demand additional information during the broadcasting regarding merchandise used by performers, clothes of performers, or the location at which the program was filmed. Accordingly, as demands for such detailed information about the program have grown, a service for providing additional information corresponding to the broadcasting contents is gaining importance.

SUMMARY

Accordingly, in one aspect, there is provided an apparatus and a method for generating additional information about moving picture content by use of web information.

An apparatus for generating additional information about moving picture content is configured to determine location information about an image frame in web information in moving picture content to which the image frame belongs, and to generate additional information by use of the determined location information and the web information. The additional information generating apparatus may be further configured to synchronize additional information about the image frame in the web information with a matched image frame in the moving picture content by use of the determined location information.

In one general aspect, there is provided an apparatus of generating additional information about moving picture content. The additional information generating apparatus is configured to compare image feature information about each image frame in moving picture content with image feature information about each image frame in web information to find an image frame in the moving picture content that matches the image frame included in the web information. Location information about the found image frame is determined in the moving picture content. An additional information generating unit may be configured to generate additional information by use of the determined location information and the web information.

The additional information generating unit may be configured to determine a range in the moving picture content to be compared by use of meta information that is extracted from the web information and is related to the image frame included in the web information. The meta information may include image content identification information, genre information, and title information.

The additional information may represent web information that includes the image frame, and/or information extracted from text related to the image frame included in the web information.

In one example, an additional information generating apparatus searches for an image frame related to a predetermined keyword in moving picture content by use of web information. The additional information generating apparatus may be configured to extract at least one keyword from each text related to the image frame included in the web information and to perform clustering on the image frames included in the web information according to a common keyword. In addition, in response to at least two same sort of image frames being clustered by corresponding to a same keyword, the additional information generating apparatus may be further configured to assign a ranking to the same sort of image frames based on a number of the same sort of image frames, and sort the same sort of image frames by the ranking.

The additional information generating apparatus may include a component which collects web information, analyzes the collected web information to extract image feature information about image frames included in the web information from the analyzed web information, and stores the extracted image feature information. In addition, the additional information generating apparatus may include a component which extracts image feature information about the image frames in the moving picture content and location information about the image frames in the moving picture content and store the extracted image feature information and location information.

The apparatus may further include a web information processing unit configured to: collect web information, analyze the collected web information to extract image feature information about image frames in the web information from the analyzed web information, and store the extracted image feature information; and a moving picture content processing unit configured to: extract image feature information about the image frames in the moving picture content and location information about the image frames in the moving picture content; and store the extracted image feature information and location information.

In another general aspect, there is provided a method of generating additional information of moving picture content. The method is performed as follows. Image feature information about each image frame in moving picture content is compared with image feature information about each image frame in web information. An image frame in the moving picture content, which matches the image frame included in the web information, is searched for. Location information about the found image frame may be determined in the moving picture content. Additional information may be generated by use of the determined location information and the web information.

The method may further include, before the comparing: extracting meta information, related to the image frame in the web information, from the web information; and determining a range of the moving picture content to be compared by use of the extracted meta information. In addition, the meta information may include at least one of image content identification information, genre information, and title information. The additional information may include web information, the web information including the image frame. The additional information may include information extracted from text related to the image frame in the web information. The method may also include: extracting at least one keyword from each text related to the image frame in the web information, and performing clustering on the image frames in the web information according to a common keyword. In addition, the method may include, in response to at least two same sort of image frames being clustered by corresponding to a same keyword: assigning a ranking to the same sort of image frames based on a number of the same sort of image frames, and sorting the same sort of image frames by the ranking. The providing of additional information about the image frame in the web information may include synchronizing the image frame in the web information with the matched image frame in the moving picture content by use of the determined location information.

Moreover, the method may include: collecting web information, analyzing the collected web information to extract image feature information about image frames in the web information from the analyzed web information, storing the extracted image feature information, extracting image feature information about the image frames in the moving picture content and location information about the image frames in the moving picture content, and storing the extracted image feature information and location information.

Other features and aspects will be apparent from the following detailed description, the drawings, and the claims.

Figure 1:
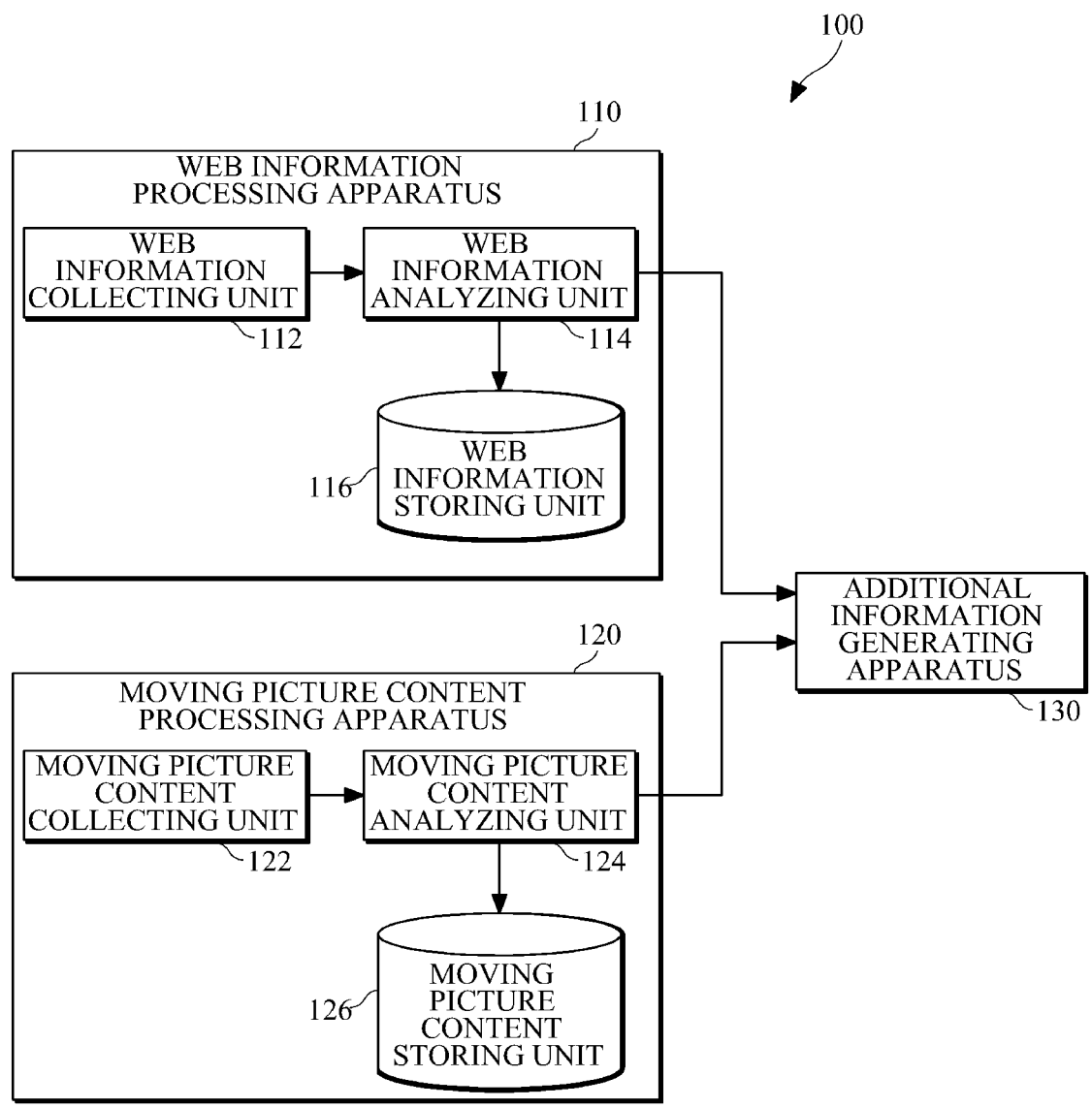
FIG. 1 is a block diagram illustrating an example of a system of generating additional information about moving picture content.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Descriptions of well-known functions and structures are omitted to enhance clarity and conciseness.

FIG. 1 depicts an example of a system of generating additional information about moving picture content. An example of an additional information generating system 100 includes a web information processing apparatus 110, a moving picture content processing apparatus 120, and an additional information generating apparatus 130. The additional information generating apparatus 130 is configured to generate additional information about moving picture content by use of information received from the web information processing apparatus 110 and the moving picture content processing apparatus 120. The web information processing apparatus 110 is configured to collect and analyze web information, and the moving picture content processing apparatus 120 is configured to collect and analyze moving picture content.

As shown in FIG. 1, the additional information generating apparatus 130 may be connected to the web information processing apparatus 110 and the moving picture content processing apparatus 120 through a network. Meanwhile, the additional information generating apparatus 130 may be provided with at least one of the web information processing apparatus 110 and the moving picture content processing apparatus 120. The additional information generating apparatus 130 may be provided as a personal computer or a mobile terminal device such as personal digital assistants (PDA) or mobile phones. Alternatively, the additional information generating apparatus 130 may be provided as moving picture content providing server which receives moving picture content request from a client device (not shown) connected to the moving picture content server through a network and provides additional information together with requested moving picture content.

The web information processing apparatus 110 includes a web information collecting unit 112, a web information analyzing unit 114, and a web information storing unit 116.

The web information collecting unit 112 may be configured to browse and collect massive amounts of web information. The web information analyzing unit 114 is configured to analyze the collected web information, for each piece of web information, extracting image feature information about each image frame in the web information and analyzing text information related to the image frames for each web information.

The web information analyzing unit 114 may extract meta information about the image frames, such as the genre of script and the title and episode/season of a broadcast program, from the text information related to the image frames and store the extracted meta information in the web information storing unit 116. In general, since a predetermined image frame and the text information related to the predetermined image frame are disposed adjacent to each other and divided into paragraphs on a web page, the text information related to a predetermined image frame can be easily determined. The genre of the script may be divided into the overview on products, the overview of performers, and the synopsis.

The web information storing unit 116 may store web addresses of web information from which image frames have been extracted, image feature information about the image frames, and text information related to the image frames, and/or meta information extracted from the text information.

The moving picture content processing apparatus 120 may include a moving picture content collecting unit 122, a moving picture content analyzing unit 124, and a moving picture content storing unit 126.

The moving picture content collecting unit 122 may collect moving picture content from a broadcasting station or a content provider. The moving picture content analyzing unit 124 may extract image feature information and location information about image frames included in moving picture content. The image feature information may be extracted, e.g., at a predetermined interval, from image frames which are selected from image frames constituting moving picture content. Alternatively, the image feature information may be extracted from key frames in the moving picture content.

The moving picture content storing unit 126 may store the image frames, the image feature information about the image frames, and the location information about the image features corresponding to each of the image frames.

The additional information generating apparatus 130 may generate additional information about moving picture content by use of information collected from the web information processing apparatus 110 and the moving picture content processing apparatus 120. The additional information generating apparatus 130 may compare image feature information about each image frame in moving picture content with image feature information about each image frame in web information.

The additional information generating apparatus 130 may search for an image frame in the moving picture content that matches an image frame in the web information based on the comparison result about the similarity between the image feature information about each of the image frames in the moving picture content and each of the image frames included in the web information. The additional information generating apparatus 130 may determine location information about the found image frame in the moving picture content. After that, the additional information generating apparatus 130 may generate additional information by use of the determined location information and the web information.

The additional information may represent web information itself including the image frame. Alternatively, the additional information may represent information extracted from text related to the image frame which is included in the web information.

The additional information generating apparatus 130 may determine a comparison range of the moving picture content to be compared with the image frame included in the web information. The comparison range of the moving picture content may be reduced based on meta information about moving picture content that is extractable from the web information, such as the title of the moving picture content and the episode/season of a broadcast program. Such a reduction of the comparison range may increase the matching speed between the image frames.

The additional information generating apparatus 130 may allow the additional information about the moving picture content to be automatically generated using the web information. The configuration of the additional information generating apparatus 130 will be described in detail with reference to FIG. 2.

Figure 2:
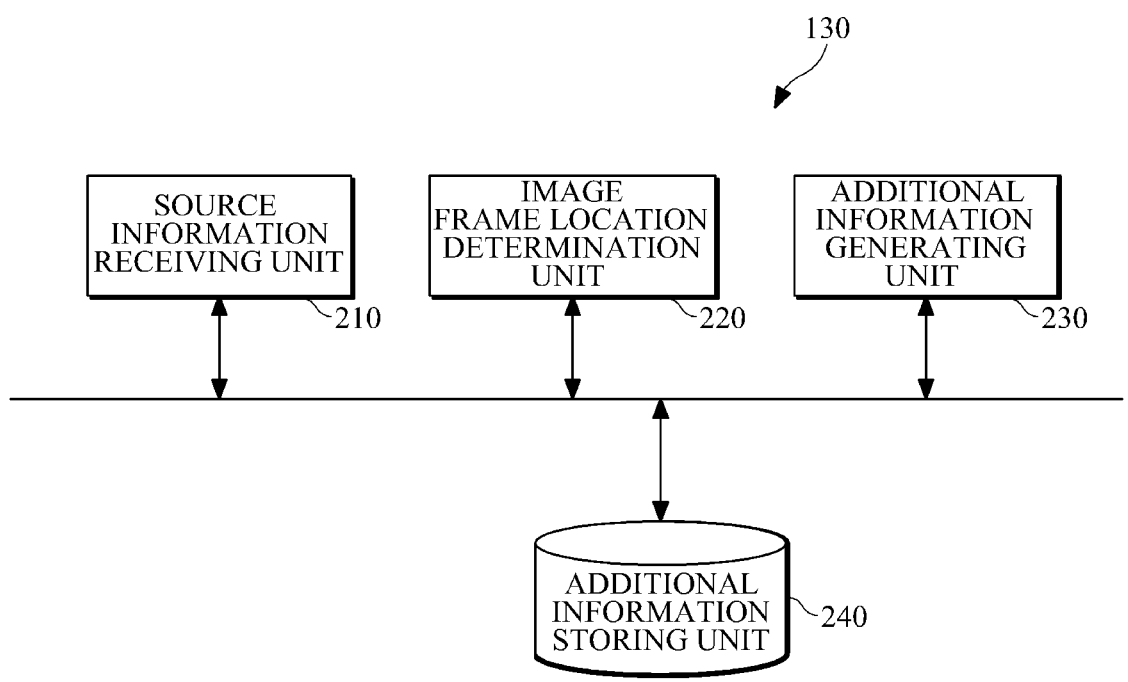
FIG. 2 is a block diagram illustrating an example of an apparatus for generating additional information about moving picture content.

FIG. 2 illustrates an example of an apparatus for generating additional information about moving picture content. The additional information generating apparatus 130 may include a source information receiving unit 210, an image frame location determination unit 220, an additional information generating unit 230, and a storing unit 240.

The source information receiving unit 210 may receive source information used to generate example additional information from the web information processing apparatus 110 and the moving picture content processing apparatus 120.

The image frame location determination unit 220 may extract meta information, related to image frames included in web information, from the web information and then determines a comparison range of moving picture content by use of the extracted meta information. The meta information may include at least one of image content identification information, genre information, and title information.

The image frame location determination unit 220 may compare image feature information about each image frame in the moving picture content within the determined comparison range with image feature information about each image frame in the web information. The image frame location determination unit 220 may search for an image frame in the moving picture content that matches an image frame included in the web information. The matched image frame may represent an image which has been subject to various kinds of signal processing, such as image reduction, a partially cropped image, an image having a reply, and an image having a modified resolution, as well as an image frame completely matching the image frame included in the web information. The image frame location determination unit 220 may determine location information relating to the found image frame in the moving picture content.

The image feature information (e.g., feature or descriptor) used in the example additional information generating apparatus is nonlimiting. For example, the image feature information may be generated through an extraction scheme generally known in the art such as a scalable color descriptor, a color layout descriptor, an edge histogram descriptor, a dominant color descriptor, an illumination invariant color descriptor, or a scale invariant feature transform.

Whether image frames match each other may be determined by comparing image feature information. The matching between image frames may be checked using various schemes. For example, the matching between image frames may be checked by use of an image feature matching and searching, a method of searching for a same sort of image using a feature vector, a brute-force scheme, a similar image clustering, a vantage object, or a hash-based approach.

Meanwhile, the additional information generating unit 230 may extract at least one keyword from text information related to the image frames included in the web information. After that, the additional information generating unit 230 may perform clustering on the image frames according to a keyword. The additional information generating unit 230 may perform a morphological analysis and/or a syntactic analysis on the text information, extracting a keyword from the text information. In response at least two same sort of image frames being clustered by corresponding to the same keyword, the additional information generating unit 230 may assign a ranking to the same sort of image frames based on the number of same sort of image frames. The term "same sort of image frame" refers to any matched image frames described above, for example, a reduced image, a partially cropped image, or an image having a similarity exceeding or less than a critical value with respect to the image frame in the moving picture content.

Additional information generated in the additional information generating unit 230 may be stored in the storing unit 240. The additional information generating apparatus 130 may receive a user request signal and provide additional information corresponding to the request signal. The additional information generating apparatus 130 may further include a user input signal receiving unit, a video decoder to replay moving picture content, and an output unit which outputs audio data and video data to provide moving picture content and additional information.

The additional information generating unit 230 may synchronize additional information about an image frame included in the web information with an image frame in the moving picture content corresponding to the determined location information. For example, when a news program is shown through an IPTV, moving picture content of the news program can be provided together with additional information. The additional information may include web pages, which may contain the same moving picture content of news, news articles, news scripts, replies and news related to the present news, and information extracted from the web pages.

Figure 3:
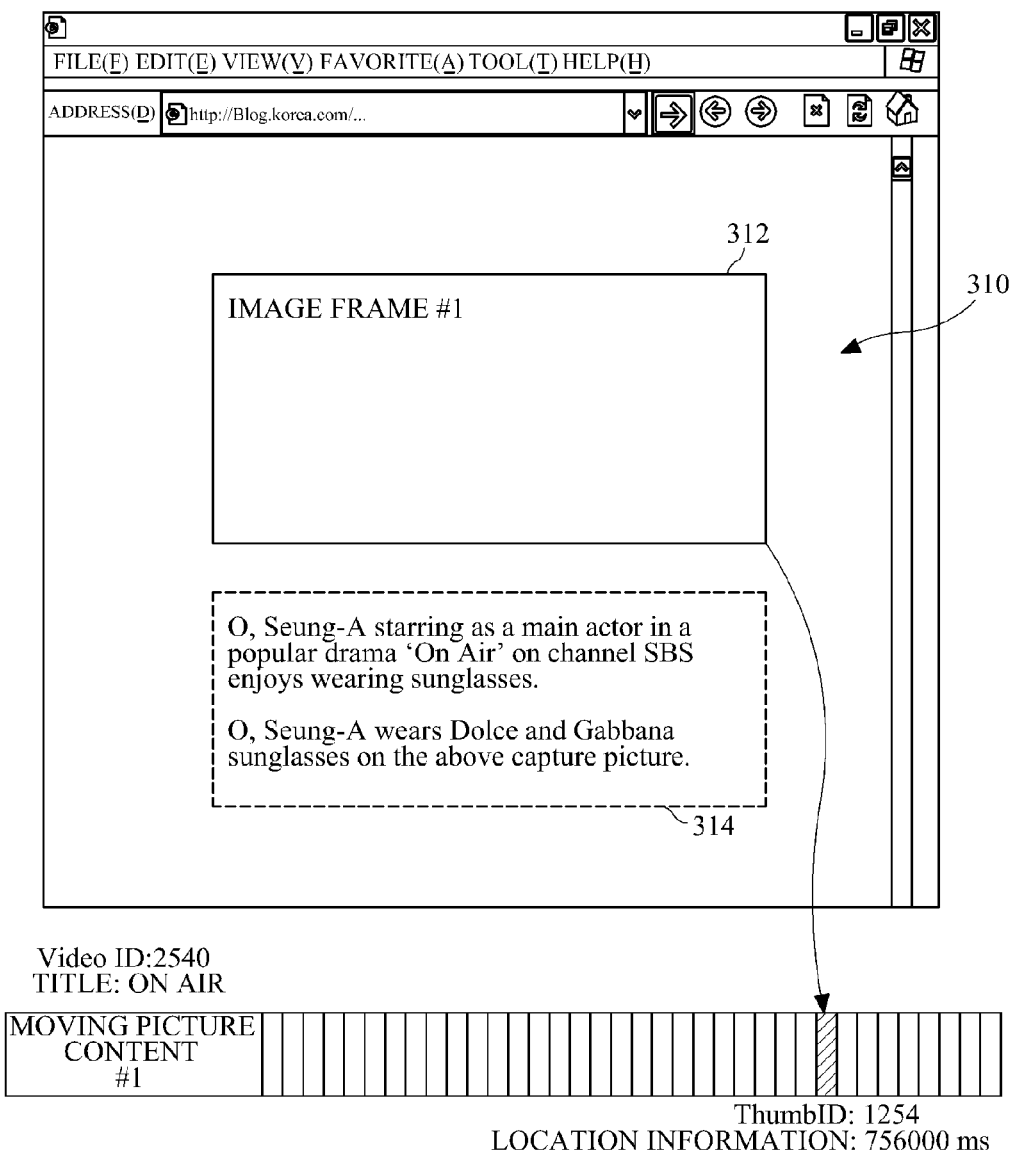
FIG. 3 is a conceptual diagram illustrating an example of a matching relationship between an image frame of web information and an image frame of moving picture content.

FIG. 3 depicts an example of a matching relationship between an image frame of the web information and the image frame of moving picture content. As shown in FIG. 3, an example of the additional information generating apparatus 130 receives an image frame #1 312 and meta information about the image frame #1 312 from the web information processing apparatus 110. For example, the meta information about the image frame #1 312 may be information representing that the image frame #1 is a scene belonging to a broadcast program called "On Air." After that, the additional information generating apparatus 130 may request the moving picture content processing apparatus 120 to provide broadcast program contents of a program called, e.g., 'On Air,' image feature information about image frames of the broadcast program contents and location information about the image frames in the broadcast program contents.

In response to the additional information generating apparatus 130 receiving information about an episode/season of the broadcast program called, e.g., "On Air," that is, meta information about the corresponding broadcast program from the web information processing apparatus 110, the additional information generating apparatus 130 may request the moving picture content processing apparatus 120 to provide moving picture contents of the corresponding episode/season, that is, broadcast programs of the corresponding episode/season. After that, the additional information generating apparatus 130 may receive image feature information and location information about image frames included in the corresponding moving picture contents from the moving picture content processing apparatus 120. In this regard, if the additional information generating apparatus 130 obtains the episode/season information, the range of the moving picture content to be compared with the image frame #1 312 may be reduced as compared to where the episode/season information is not provided to the additional information generating apparatus 130.

In response to the additional information generating apparatus 130 receiving the image frame #1 312, image feature information about the image frame #1 312, a title of the image frame #1 312, and episode/season information about moving picture content including the image frame #1 312 from the web information processing apparatus 110, the additional information generating apparatus 130 may receive image feature information and location information about image frames included in the corresponding moving picture content from the moving picture content processing apparatus 120. The additional information generating apparatus 130 may compare the image feature information about the image frame #1 with the image feature information about the image frames of the received moving picture content, and may determine location information about an image frame having image feature information about the moving picture content that matches the image feature information about the image frame #1 312.

The additional information generating apparatus 130 may use the determined location information and the web information, generating additional information corresponding to image frames of moving picture contents. For example, the additional information may include moving picture content identification information, moving picture content title information, location information about image frames included in moving picture content, and information extracted from web information related to an image frame of moving picture content. As shown in FIG. 3, "Video ID" may be an identifier of identifying moving picture content. "Title" may be title information about the moving picture content. "Thumb ID" may be an identifier of an image frame included in the moving picture content. "Location information (Pos)" may represent a temporal location of the image frame in the moving picture content.

In this manner, when an image frame having location information corresponding to predetermined additional information is replayed, the corresponding additional information may be displayed together with the image frame. The display time of the additional information may be set by a user arbitrarily or the additional information may be displayed to a shot boundary at which a scene transition is performed.

Figure 4:
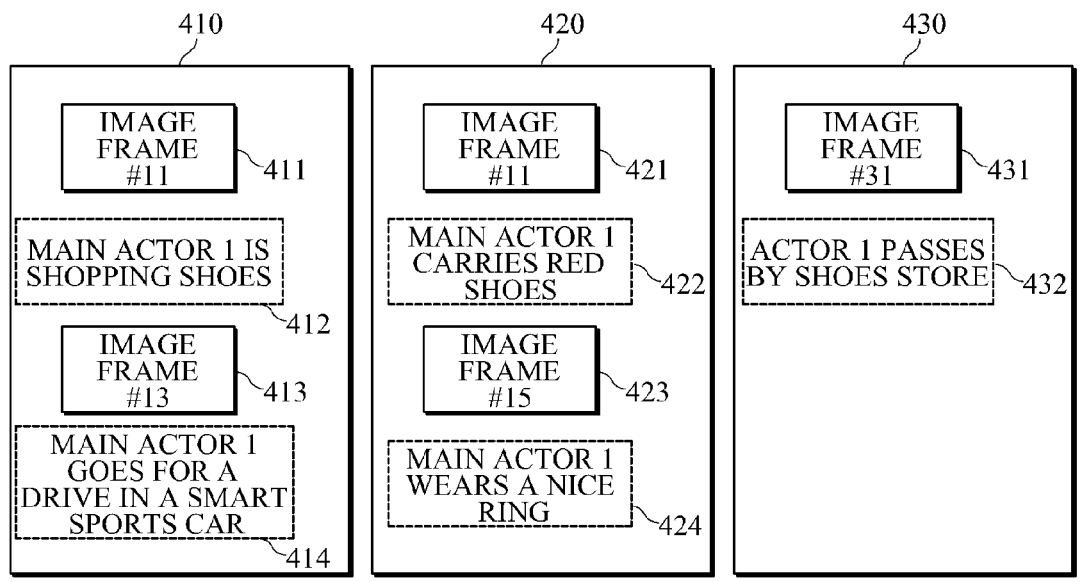
FIG. 4 is a conceptual diagram illustrating an example of a keyword clustering for image frames.
Figure 4:
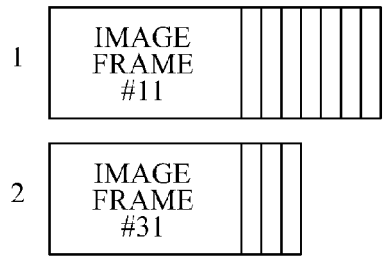

FIG. 4 illustrates an example of a keyword clustering process of image frames. If a single web page includes one or more images, the additional information generating apparatus 130 may perform indexing by connecting keywords extracted from paragraphs of the web page to images related to the extracted keywords.

As shown in FIG. 4, a web page 410 may include two paragraphs, one of which including an image frame #11 411 and text 412, and the other one including an image frame #13 413 and text 414. In the example of image frame #11 411, "performer 1" "shoes" and "shopping" are extracted from the text 412 related to the image frame #11 411 and indexed to serve as related keyword information. In the example of image frame #13 413, "performer 1" "sports car," and "drive" of the text 414 related to the image frame #13 413 are indexed to serve as related keyword information.

A web page 420 may include two paragraphs, one of which including an image frame #11 421 the same as the image frame #11 411 and text 422, and the other one including an image frame #15 423 and text 424. In the example of the image frame #11 421, "performer 1" and "shoes" are extracted from the text 422 related to the image frame #11 421 and indexed to serve as related keyword information. In the example of the image frame #15 423, "performer 1" and "ring" of the text 424 related to the image frame #15 423 are indexed to serve as related keyword information.

A web page 430 may include one paragraph, including an image frame #31 431 and text 432. In the example of the image frame #31 431, "performer 1," "shoes," and "shop" are extracted from the text 432 related to the mage frame #31 431 and indexed to serve as related keyword information.

The additional information generating apparatus 130 may perform clustering on the image frames included in the web information according to the common keyword. For example, the image frame #11 411, the image frame #11 421, and the image frame #31 431 may be clustered corresponding to the keyword "shoes." The additional information generating apparatus 130 may determine, as a same sort of image frames, image frames of the image frames that are clustered by corresponding to the same keyword and that match each other.

As shown in FIG. 4, the image frame #11 411 and the image frame #11 421 may be determined as the same sort of image frames having matching image feature information. In this case, keywords of image frames may be indexed based on a plurality of web pages including the web pages 410, 420 and 430. From the image frames clustered corresponding to the keyword "shoes," if ten image frames are collected as being same as the image frames #11 411 and 421 and five image frames are collected as being same as the image frame #31 431, the first ranking may be assigned to the image frames #11 412 and 413, and the second ranking is assigned to the image frame #31 431. In this manner, the additional information generating apparatus 130 may provide ranking information on the image frames clustered corresponding to the keyword of "shoes."

In one example, one of the same sort of image frames clustered corresponding to the same keyword may be selected as a representative image frame and may be provided together with ranking information. If necessary, the same sort of image frames may be sequentially provided.

As described above, the location information corresponding to image frames of web information can be determined in moving picture content by comparing image feature information. For example, if a user selects a representative image in a cluster, a location of a moving picture corresponding to the representative image may be determined and thus the moving picture content may be replayed from the corresponding location.

Such an operation of providing the moving picture content corresponding to the representative image may be performed when a user inputs a keyword. If clustering is performed after the keyword is input, searching time may be increased. However, if the clustering result according to each keyword is stored, a searching result can be rapidly provided in response to a search inquiry of a user.

Figure 5:
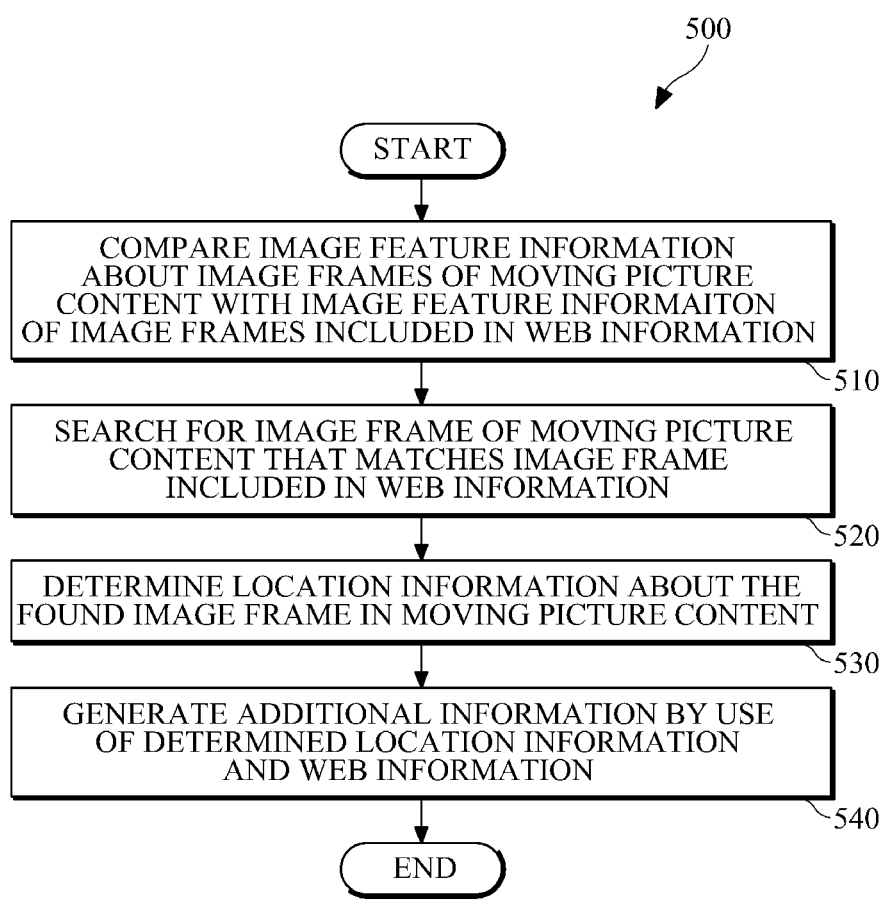
FIG. 5 is a flow diagram illustrating an example of a method for generating additional information about moving picture content.

FIG. 5 illustrates an example of a method 500 for generating additional information about moving picture content. Image feature information about image frames of moving picture content is compared with image feature information about image frames included in web information (operation 510). By use of the comparison result, image frames in the moving picture content that match an image frame included in the web information may be found (operation 520). In response to image frames compared to each other having a similarity included within a predetermined critical range, the image frames may be determined as matched image frames.

Location information about the found image frames in the moving picture content may be determined (operation 530). Moving picture content processing information may include image feature information and location information about image frames constituting moving picture content. Accordingly, in response to an image frame in the moving picture content being determined, location information about the image frame may be determined. By use of the determined location information and the web information, additional information may be generated (operation 540).

While watching a moving picture, a viewer can receive additional information corresponding to a frame of the moving picture, and thus the viewer does not need to browse the internet to find the additional information, improving the convenience and satisfaction with regards to use of moving pictures.

From the perspective of a service provider, a process of tagging additional information may be automated, so the time and labor required to generate information may be reduced and the cost required to provide additional information may be reduced. Since additional information may be obtained from various sources on the internet, diverse and abundant additional information can be provided. In addition, the location of a moving picture related to a predetermined keyword can be searched for without requiring a manual tagging process to be performed.

The disclosure can also be embodied as computer readable codes on a computer readable recording medium. Also, functional programs, codes, and code segments for accomplishing the present invention can be easily construed by programmers skilled in the art to which the present invention pertains. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, non-transitory media, and carrier waves such as data transmission through the Internet. The computer readable recording medium can also be distributed over network coupled computer systems so that the computer readable code is stored and executed in a distributed fashion.

Included are an apparatus and a method for generating additional information about moving picture content. The additional information generating apparatus is configured to collect meta information related to image frames in web information and image feature information about the image frames, and to collect image feature information of each image frame in moving picture content and location information of each image frame in the moving picture content. The additional information generating apparatus is further configured to determine location information of an image frame in the moving picture content, the image frame matching the image frame in the web information by use of the collected information. Additional information is generated by use of the determined location information and web information.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating additional information about moving picture content, the apparatus comprising:
an image frame location determination unit configured to:
compare image feature information about each image frame in moving picture content with image feature information about each image frame in web information to find an image frame in the moving picture content that matches the image frame in the web information; and
determine location information about the found image frame in the moving picture content; and
an additional information generating unit configured to generate additional information by use of the determined location information and the web information.

2. The apparatus of claim 1, wherein the image frame location determination unit is further configured to:
extract meta information, related to the image frame in the web information, from the web information; and
determine a range of the moving picture content to be compared by use of the extracted meta information.

3. The apparatus of claim 2, wherein the meta information comprises at least one of image content identification information, genre information, and title information.

4. The apparatus of claim 1, wherein the additional information comprises web information, the web information including the image frame.

5. The apparatus of claim 1, wherein the additional information comprises information extracted from text related to the image frame in the web information.

6. The apparatus of claim 1, wherein the additional information generating unit is further configured to:
extract at least one keyword from each text related to the image frame in the web information; and perform clustering on the image frames in the web information according to a common keyword.

7. The apparatus of claim 6, wherein, in response to at least two same sort of image frames being clustered by corresponding to a same keyword, the additional information generating unit is further configured to:
assign a ranking to the same sort of image frames based on a number of the same sort of image frames; and
sorts the same sort of image frames by the ranking.

8. The apparatus of claim 1, wherein the additional information generating unit is further configured to synchronize the additional information about the image frame in the web information with the matched image frame in the moving picture content by use of the determined location information.

9. The apparatus of claim 1, further comprising:
a web information processing unit configured to:
collect web information;
analyze the collected web information to extract image feature information about image frames in the web information from the analyzed web information; and
store the extracted image feature information; and
a moving picture content processing unit configured to:
extract image feature information about the image frames in the moving picture content and location information about the image frames in the moving picture content; and
store the extracted image feature information and location information.

10. A method for generating additional information about moving picture content, the method comprising:
comparing image feature information about each image frame in moving picture content with image feature information about each image frame in web information;
searching for an image frame in the moving picture content, the image frame matching the image frame in the web information;
determining location information about the found image frame in the moving picture content; and
generating additional information by use of the determined location information and the web information.

11. The method of claim 10, further comprising, before the comparing:
extracting meta information, related to the image frame in the web information, from the web information; and
determining a range of the moving picture content to be compared by use of the extracted meta information.

12. The method of claim 11, wherein the meta information comprises at least one of image content identification information, genre information, and title information.

13. The method of claim 10, wherein the additional information comprises web information, the web information including the image frame.

14. The method of claim 10, wherein the additional information comprises information extracted from text related to the image frame in the web information.

15. The method of claim 10, further comprising:
extracting at least one keyword from each text related to the image frame in the web information; and
performing clustering on the image frames in the web information according to a common keyword.

16. The method of claim 15, further comprising, in response to at least two same sort of image frames being clustered by corresponding to a same keyword:
assigning a ranking to the same sort of image frames based on a number of the same sort of image frames; and
sorting the same sort of image frames by the ranking.

17. The method of claim 10, wherein the providing of additional information about the image frame in the web information comprises synchronizing the image frame in the web information with the matched image frame in the moving picture content by use of the determined location information.

18. The method of claim 10, further comprising:
collecting web information;
analyzing the collected web information to extract image feature information about image frames in the web information from the analyzed web information;
storing the extracted image feature information;
extracting image feature information about the image frames in the moving picture content and location information about the image frames in the moving picture content; and
storing the extracted image feature information and location information.

19. The apparatus of claim 1, wherein the apparatus for generating additional information receives the image feature information of the web information from a first processor, receives the image feature information of the moving image content from a second processor, and compares the image feature information of the web information with the image feature information of the moving image content in a third processor.

20. The apparatus of claim 1, wherein the moving image content is displayed on one display and the additional information is displayed on another separate display.

21. The apparatus of claim 1, wherein a plurality of image frames in moving picture content are compared with a plurality of image frames in web information and the generated additional information for each image frame in moving picture content is stored in an additional information storage unit.

* * * * *